United States Patent [19]
Polendo-Loredo

[11] Patent Number: 4,804,524
[45] Date of Patent: Feb. 14, 1989

[54] PROCESS FOR THE PREPARATION OF BORIC ACID FROM COLEMANITE AND/OR HOWLITE MINERALS

[75] Inventor: Jose Polendo-Loredo, Monterrey, Mexico

[73] Assignee: Materias Primas Magdalena, S.A. De C.V., Monterrey, Mexico

[21] Appl. No.: 170,056

[22] Filed: Mar. 16, 1988

Related U.S. Application Data

[63] Continuation-in-part of Ser. No. 8,527, Jan. 29, 1987, abandoned.

[30] Foreign Application Priority Data

Jan. 29, 1986 [MX] Mexico ................................. 1388

[51] Int. Cl.$^4$ .............................................. C01B 35/10
[52] U.S. Cl. ....................................... 423/283; 423/87; 423/122; 423/166; 423/286; 423/397; 423/629
[58] Field of Search ............ 423/283, 294, 166, 573 R, 423/87, 388, 412, 289, 122, 286, 397, 629; 23/295 R

[56] References Cited

U.S. PATENT DOCUMENTS

| | | | |
|---|---|---|---|
| 2,089,406 | 8/1937 | Newman | 423/289 |
| 3,482,936 | 12/1969 | Russell | 423/283 |
| 3,650,690 | 3/1972 | Shiloff | 423/283 |
| 3,653,818 | 4/1972 | Mathis | 423/278 |
| 4,196,177 | 4/1980 | Sallay | 423/280 |
| 4,329,154 | 5/1982 | Shono et al. | 423/283 |
| 4,435,184 | 3/1984 | Schroeder et al. | 23/300 |

Primary Examiner—Anthony McFarlane
Attorney, Agent, or Firm—Abelman Frayne Rezac & Schwab

[57] ABSTRACT

A process for the preparation of boric acid from colemanite and/or howlite minerals basically comprising: treating the mineral with sulfuric acid in order to dissolve boron compounds from the minerals; separating a solution formed by the chemical reaction, from the solids in suspension; reacting said solution with hydrogen sulfide in order to precipitate arsenic and iron impurities contained in the solution; separating the impurities precipitated from the remaining solution; reacting said remaining solution with ammonia so as to precipitate aluminum impurities; separating said aluminum impurities form the remaining solution; reacting the latter with hot sulfuric acid in order to generate boric acid; cooling the reaction mixture in order to precipitate the boric acid; and separating the boric acid from the remaining solution, being the latter susceptible to be recycled to the sulfuric acid treatment stage in order to concentrate the mineral. Also regeneration of ammonia is achieved so as to be used again in the process.

7 Claims, 2 Drawing Sheets

PROCESS FOR THE PREPARATION OF BORIC ACID FROM COLEMANITE AND/OR HOWLITE MINERALS

This application is a continuation-in-part of application Ser. No. 008,527, filed Jan. 29, 1987, now abandoned.

FIELD OF THE INVENTION

The present invention refers to a process for the preparation of boric acid from colemanite and/or howlite minerals, and, more particularly, the invention is related with a process for benefice colemanite ($2CaO.3B_2O_3.5H_2O$) and or howlite ($4CaO.5B_2O_3.2SiO_2.5H_2O$) in order to obtain boric acid which, on turn, is used as a source of $B_2O_3$ for the manufacture of glass, ceramics, refractories, etc.

BACKGROUND OF THE INVENTION

A multiplicity of process to obtain boron compounds are well known in the art, particularly boric acid, from minerals containing boron such as colemanite and/or howlite minerals, as well as other minerals containing borax, among which that described by Taylor, U.S. Pat. No. 2,746,841, granted to Borax Consolidated, Ltd. and issued on May 22, of 1956, can be mentioned. In that process a mineral containing insoluble minerals and borax ($Na_2B_4O_7.10H_2O$) together a mother liquid obtained from the process for dissolving borax are introduced in a dissolving tank; and the borate solution is separated from the insoluble fraction of the mineral in order to take the clear solution to a sulfate reactor. The solution is treated with sulfuric acid so as to convert all of the sodium oxide in the solution to sodium sulfate, thus producing an acid solution containing, primarily, sodium sulfate and boric acid. The acidified solution is heated so that the concentration of sodium sulfate exceeds the solubility of normal saturation at the existing temperature in order to precipitate anhydrous sodium sulfate. The precipitate is separated from the solution and washed so that it can be sold as pure sodium sulfate. The remaining solution, saturated with sodium sulfate and containing boric acid in elevated concentrations but not reaching to saturation, is cooled or is concentrated and then cooled; this increases the solubility of the sulfate and boric acid is precipitated which is crystallized from the cooled solution. The resulting crystals are separated from the solution and the boric acid thus crystallized is obtained as a product of the process. The remaining solution, which still contains sodium sulfate and boric acid in sufficiently high amounts to produce saturation, is returned as mother liquid to the mineral dissolving tank so that the dissolution stage can take place.

Another process known for the obtainment of boric acid is that one described and claimed by Dwyer in the U.S. Pat. No. 3,103,412 issued Sept. 10, 1963, assigned to Tholand, Inc. In that method treats minerals containing calcium borate, such as colemanite and howlite, are treated to recover useful boron compounds from said minerals. The process comprising: mixing the mineral with aqueous ammonium sulfate; heating the mixture to produce an ammonium pentaborate mud, precipitated calcium sulfate and gangue; filtering the mud to separate calcium sulfate and the gangue; cooling the filtrate in order to crystallizing the ammonium pentaborate; separating the crystalline pentaborate and reacting it with sulfuric acid in order to form boric acid and ammonium sulfate. Said boric acid is recovered as a reaction product and the ammonium sulfate solution thus formed is used to treat additional amounts of the mineral.

Still another process to obtain boric acid from colemanite is one described by Mathis, Pierre (Solvay et Cie.) German Publication No. 2,020,570, dated Nov. 12, 1970, in which boric acid is prepared through the decomposition of crude or calcined colemanite with $CO_2$ at a pressure higher than atmospheric pressure and at moderate temperatures in the presence of water to separate the solid phase from the liquid phase, and crystallize the boric acid from said liquid phase.

Another process to obtain boric acid through the decomposition of colemanite is described by Bozadzhiev, P. (Bulgarian), God Vissh Khim-Tekhnol Inst. Sofia, 1973, 21 (2), 79-84 which comprises: producing boric acid by decomposition of the colemanite with monocalcium phosphate and double superphosphate. Decomposition percentages of 99.9% have been reported with said monocalcium phosphate and 98.1% with the double superphosphate.

Another process for the decomposition of colemanite is that one described by Bozadzhiev. P. (Bulgarian) God, Vissh Khim-Tekhnol Inst. Sofia. 1973 21 (2), 67-77 in which the colemanite is discomposed in the presence of an excess of phosphoric acid, through the reaction of colemanite with 15% phosphoric acid with which a practically quantitative decomposition within 60 minutes at a low temperature or 20 minutes at a higher temperature is achieved. The velocity of decomposition is controlled by diffusion so that a layer of the diffusion virtually consists of pure boric acid while starting from colemanite, monocalcium phosphate is formed.

Another process to obtain boric acid starting from minerals containing calcium, sodium and boron, such as ulexite, is described by Werner Janik et al in the Polish Pat. No. 218, 576, issued Sept. 26, 1979 appearing in German publication No. 3,029,349, issued Apr. 16, 1981. It includes the manufacture of boric acid from Peruvian ulexite by heating said ulexite in 96% sulfuric acid in an amount sufficient to precipitate calcium sulfate, resulting a suspension of calcium sulfate in a solution of boric acid plus other secondary products. The calcium sulfate is separated from the solution and is then treated with ion exchange apparatus in order to obtain the boric acid by acidification, crystallization and purification.

Finally, another process is known to obtain boric acid from minerals such as Kernite. This method is described by Miroslav Novak in the Czechoslovakian Pat. No. 184,560, dated Feb. 15, 1981. With this method, 74 to 83% of the total $B_2O_3$ contained in the kernite mineral or in the borax is recuperated through the decomposition of such minerals with diluted nitric acid at a relatively elevated temperature and the separation of the crude boric acid from the cooled solution. The mother liquors are concentrated to produce additional boric acid and the residual liquid phase is evaporated to give a fertilizer containing sodium nitrate and boric acid.

However all of the process described above and others of the previous art, require to be carried out the use of a starting material i.e., of a mineral of a high grade or quality and of low degree of contamination, particularly of a low arsenic, iron and aluminum contamination since, otherwise, the resulting products would be contaminated by the stated impurities.

There are large amounts of colemanite and howlite mineral deposits of a low grade or quality and which are highly contaminated. Man has searched a long time for a way to exploit the stated deposits even though to date it has not been possible in view of the fact that all of the existing process in the previous art were unable to benefice the stated minerals with reasonable efficiency. Therefore, for a long time economic and efficient process have been searched for in order to benefice this type of minerals of low grade and high degree of contamination.

Even though numerous investigations have been carried out in order to exploit the stated minerals whether by the concentration or the beneficiating methods, including the elimination of arsenic, iron and sulfate in order to obtain a boric acid useful for the glass industry, the procedures that have been tried to date using this particular method have not been entirely satisfactory. Such process have included mechanical methods, such as mill, attrition, flotation, etc., as well as chemical methods, such as the process of lixiviation, extraction by solvents or calcination. But even with all the processes that have been tried up to now, it has been found that a mineral is produced which is more or less concentrated and beneficiated with an average yield rate of 38 to 48% of $B_2O_3$ and with a relatively high recuperation rate of from 68 to 74%. These processes have not been sufficiently economical to try on an industrial scale, and they are incapable of adequately eliminating the arsenic, iron and aluminum contaminates contained in the minerals.

OBJECTIVES OF THE INVENTION

Having in mind the defects of the existing processes in the previous art, it is an object of the present invention to provide a process for the preparation of boric acid from colemanite and/or howlite minerals, which can be economic, which can start from low grade minerals having a high content of impurities, and which can have a high degree of efficiency.

Another object of the present invention is to provide a process for obtaining boric acid from colemanite and howlite minerals, of the previously described nature, which, through the use of solvent extraction stages be carried out economically and efficiently in order to eliminate the impurities contained in the starting minerals and obtain very pure products.

Another object of the present invention is to provide a process for obtaining boric acid from colemanite and or howlite minerals of the type described above, which overcome the necessities to obtain a high recuperation of boron compounds contained in the starting mineral without the use of expensive procedure steps and reagents.

A more particular object of the present invention is to provide a process to obtain boric acid from colemanite and or howlite minerals, of the type previously indicated, which is capable of obtaining boric acid of an adequate purity for use in the glass industry, starting from minerals that are highly contaminated.

BRIEF SUMMARY OF THE INVENTION

The previously described objects, as well as others which are a consequence of the same, are preferably attained as follows:

In accordance with the preferred embodiments of the present invention, boric acid is produced from colemanite and or howlite minerals through a process mainly comprising: treating the mineral with sulfuric acid in order to dissolve boron compounds; separating a solution thus formed, from the solids in suspension; reacting said solution with hydrogen sulfide in order to precipitate arsenic and iron impurities contained in the solution; separating the precipitated impurities from the remaining solution; reacting said solution with ammonia in order to precipitate aluminum impurities; separating said aluminum impurities from the remaining solution; reacting the latter with hot sulfuric acid in order to generate boric acid; cooling the reaction mixture so as to precipitate the boric acid; and separating the boric acid from the remaining solution. The latter can be recycled to the stage of treatment with sulfuric acid for concentrating the mineral.

BRIEF DESCRIPTION OF DRAWINGS

The novelty aspects which are considered typical of the present invention will be particularly disclosed by the attached claims. However, the invention itself, both because of its organization as well as its method of operation, together with other objects and advantages of the same, will be better understood from the following description of specific embodiments, when it is read in relation to the attached drawings, wherein:

DETAILED DESCRIPTION

As is well known, there are enormous deposits of colemanite ($2CaO.3B_2O_3.5H_2O$) and/or howlite ($4CaO.5B_2O_3.2SiO_2.5H_2O$) which, up to date have not been beneficiated because an adequate process does not exist for the concentration of these boron minerals did not exist, together with the elimination of the impurities contained in same since the traditional process, as was previously pointed out, were not capable or purifying minerals having a high content of impurities and of a low grade.

Colemanite and howlite are minerals widely used as starting materials to obtain boric acid which, on turn constitutes a source of boric oxide ($B_2O_3$) for the manufacture of glass, ceramic, refractories, as well as other similar products, as a flux. However, the use of boric oxide for these purposes depends on the quality of the boric oxide and on the amount of impurities contained therein, particularly those of arsenic, iron and aluminum.

In accordance with the present invention, a process is provided to obtain boric acid from colemanite and/or howlite minerals, by a solvent extraction process in order to produce, as an intermediary, a colemanite which has an average of 38 to 40% of boric acid and with a surprising high recovering of 70 to 80%, from which a production of boric acid having a concentration from 92 to 96% and a recovering from 86 to 94% is obtained.

Typical colemanite and howlite minerals to be beneficiated is accordance with the present invention, are minerals reported to contain the following individual components:

$Ca_2B_6O_{11}.5H_2O$

CaSO4
CaCO3
CaHAsO4
Al2O3
MgCO3
MgSO4
Na2SO4
R2O3 (being R=Fe, Cr, Ti, etc.)
SIO2 insoluble
H2O in the form of humidity These minerals can varying considerably in concentration of the diverse components previously cited, constituting either minerals of a high purity i.e., minerals containing high concentrations of borate Ca2B6O11.5H2O, as well as low amounts of impurities, particularly Fe2O3, Al2O3 and more particularly CaHAsO4 and minerals of low grade having lower contents of borate Ca2B6O11.5H2O and higher amounts of impurities of Fe2O3, Al2O3, particularly CaHAsO4.

The process of the present invention, even though can be applied more economically to the benefit of any type of colemanite or howlite mineral of the previously described composition, is particularly useful for application to low grade and high impurity minerals in order to obtain a considerably elevated recovering and also high yields of boric acid.

Figure 1:
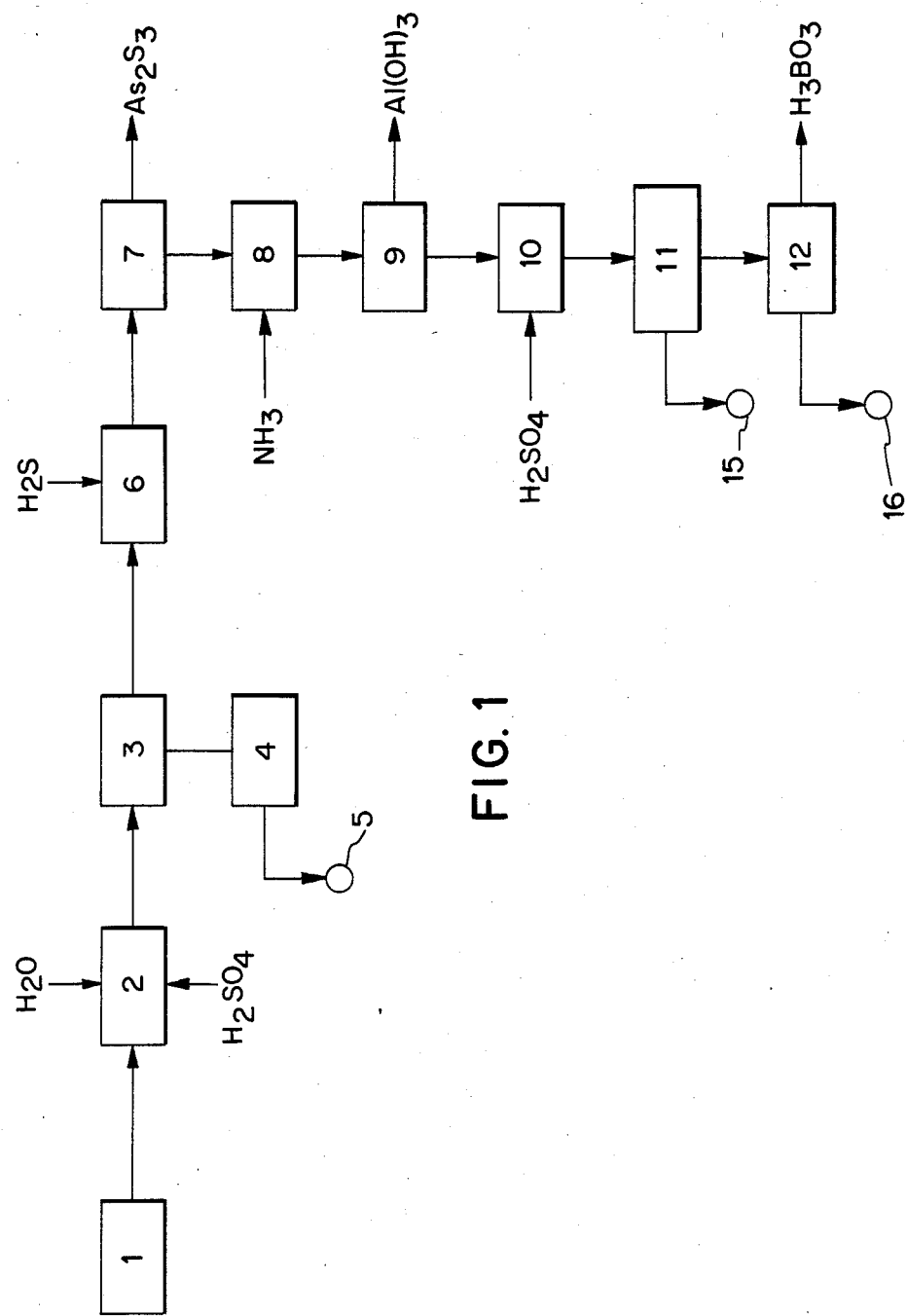
FIG. 1 is a flow diagram which illustrates the process for the preparation of boric acid, starting from colemanite and/or howlite minerals in accordance with the present invention.

Now, referring particularly to the drawings, mainly to FIG. 1, this shows a flow diagram which illustrates the process of the present invention. It is a process for concentrating colemanite or howlite mineral through a solvent extraction process with the latter obtainment of boric acid from the concentrated mineral.

Just as is illustrated in FIG. 1 of the drawings, which shows the process for the preparation of boric acid from colemanite of howlite mineral, minerals is mixed in a mixer 1 with a predetermined amount of water to afterwards send the suspension to reactor 2 wherein it is reacted with sulfuric acid 1:3 in excess, at a temperature between about 85 C. and the boiling point of the reaction product. This makes the boron contained in the starting insoluble borate to be dissolved as boric acid and remains as a solution in the suspension of the chemical reaction.

In the reactor 2, taking into consideration the components of colemanite or howlite in the treatment, take place the following chemical reactions:

Ca2B6O11.5H2O+2HSO4+2H2O→2CaSO4+6H3BO3

CaCO3+H2SO4→CaSO4+CO2+H2O

MgCO3+H2SO4→MgSO4+CO2+H2O

Al2O3+3H2SO4→Al2(SO4)3+3H2O

CaHAsO4+H2SO4→CaSO+H3AsO4
(orthoarsenic acid)

Fe2O3+3H2SO4→Fe2(SO4)3+3H2O

As can be seen from the above, the reaction that takes place in reactor 2 with sulfuric acid, forms a gangue or grey cake which is mainly formed by calcium sulfate, magnesium sulfate and other insoluble materials of gangue, and a solution containing mainly boric acid, orthoarsenic acid, ferric sulfate and aluminum sulfate.

The suspension thus formed in reactor 2 is passed through a filter 3 wherein the grey cake 4 is separated and passed to waste disposal 5 and a filtrate containing water and the materials previously indicated in solution, is then passed to reactor 6, wherein gaseous hydrogen sulfide is injected previous cooling of the solution or filtered at a temperature of about 32° C. to 90° C. The reaction with the hydrogen sulfide precipitates the compounds of arsenic in reactor 6, in accordance with the following equation:

2H2AsO4+5H2S→As2S3+2S+8H2O

The suspension obtained in reactor 6 is passed through filter 7 to separate the sulfur arsenic cake at a temperature of about 23° to 28° C. obtaining a filtrate practically free of arsenic. This filtrate is a solution of colemanite beneficiated with boron. This solution is passed to a reactor 8 wherein ammonia is injected either in a gaseous form or in the form of ammonium hydroxide in order to react the aluminum and iron compounds which contaminate the mineral originally used. Said reaction is carried out preferably at an elevated temperature between about 95 C. and the boiling point of the reaction mixture in order to precipitate aluminum hydroxide. The reactions taking place in reactor 8 are the following:

Al2(SO4)3+6NH4OH→2AL(OH)3+(NH4)2SO4

5H3BO3+NH4OH→NH4B5O8+8H2O

F2(SO4)3+6NH4OH→2Fe(OH)3+3(NH4)2SO4

The precipitated aluminum and iron hydroxides are separated from the suspension in the filter 9, and the filtrate is passed to reactor 10 wherein is reacted again with sulfuric acid at a temperature of about 70° to 98° C., in order to transform the formed ammonium perborate to boric acid.

The reaction which takes place in reactor 10 is as follows:

2NH4B5O8+H2SO4+14H2O→10H3BO3+NH4)2SO4

Afterwards, the solution obtained from the reactor 10 is cooled to a temperature between 20° and 30° C. in order to precipitate boric acid crystals in the crystallizer 11, either with or without previous evaporation thereof to be concentrated. From the crystallizer 11 a decanted liquor is obtained which contains ammonium sulfate in accordance with the embodiment illustrated in FIG. 1, it is sent to waste 15. Meanwhile, the suspended boric acid crystals in the balance of the non-decanted solution are sent to filter 12 to separate the boric acid and the filtrated liquor is sent to waste 16.

Figure 2:
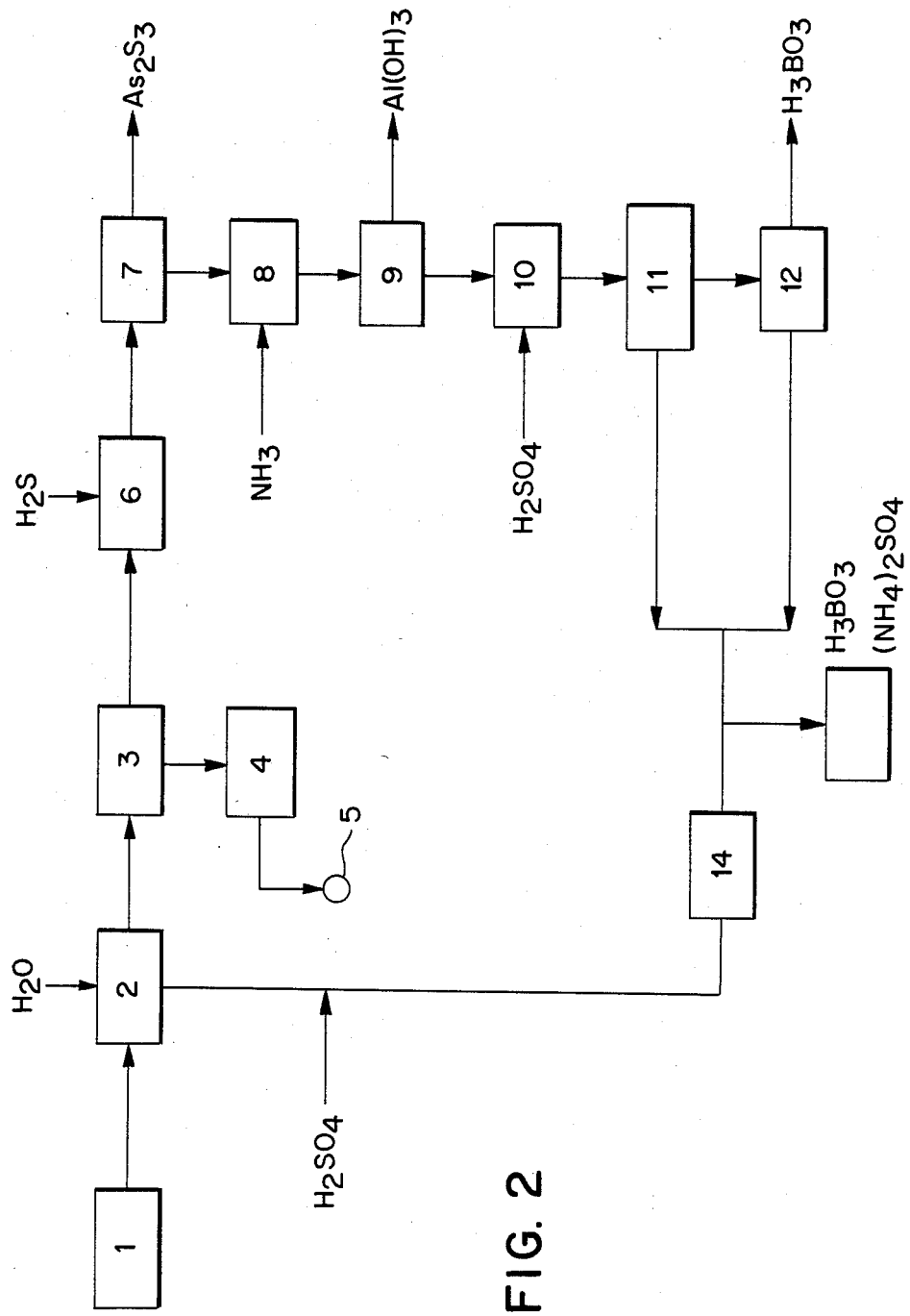
FIG. 2 is a flow diagram which illustrates another embodiment of the process of the present invention, wherein a liquor recirculation stage for the concentration of the colemanite or howlite minerals is shown.

In accordance with a particularly preferred embodiment of the invention clearly illustrated in the flow diagram of FIG. 2 of the drawings, a process identical to the previously described is carried out but with the difference that the decanted and filtrated liquors obtained from the crystallizer 11 and from filter 12 are mixed in order to constitute a solution containing boric acid (not crystallized) and ammonium sulfate, to be sent to a heater 14 wherein said solution or liquor is heated to a temperature of 85° to 95° C., in order to be mixed the sulfuric acid and be used in reactor 2 so as to repeat the cycle. Thus greater amounts of boric acid can be concentrated and recovered from the originally used mineral. However, as the concentration of ammonium sulfate in this type of recycled solution unduly tends to increase, a purge 13 is provided in order periodically to eliminate part of this solution. This is done so as to maintain an accurate concentration of ammonium sulfate which will not interfere with the reactions which take place in the described process.

The present invention will be better understood by the following performing examples which, however, will not be taken as a limitation of the scope of the invention.

EXAMPLE 1

Obtainment of boric acid from colemanite without recirculation of liquors

To 100 grams of ground colemanite mineral, 650 ml. of water at a temperature of 95° C. were added forming a suspension, afterwards 75 ml. of 1:3 diluted sulfuric acid at room temperature were added to the suspension. The mixture was heated with continuous agitation to reach the boiling point, and later the suspension was filtered while hot. From the filtering operation, 179.5 grams of a grey cake of insoluble magma which was washed with 100 ml. of water at a temperature of 95° C., as well as 900 ml. of filtrate which was used for the following reaction, were obtained.

To the thus mentioned filtrate, gaseous hydrogen sulfide was injected at a temperature approximately 28° C. in order to precipitate the arsenic in a liquor. The liquor was filtered in order to separate precipitated arsenic sulfide, forming in this way a cake of arsenic sulfide that was washed with 50 ml. of water at 28° C.

The filtrate obtained, in a amount of 800 ml., was boiled and 5 grams of ammonium sulfate were added heating for 5 minutes. Next ammonium hydroxide was added to reach at a pH of 7 and the solution was heated again to get rid off any excess ammonia which might remain in order to pecipitate the aluminum hydroxide.

The solution was allowed to rest so that the aluminum hydroxide, in suspension could be decanted and later filtered.

5 ml. of sulfuric acid 1:3 were added to the filtered liquor to acidify and regenerate the boric acid from the ammonium perborate which was formed with the addition of ammonia. Latter 800 ml. were evaporated from said liquor to achieve 150 ml. and the concentrated solution was cooled from 95° C. to 28° C., crystallizing the boric acid which was separated by filtration. 127 ml. of filtrate, as well as 24.96 grams of boric acid crystals, were thus obtained.

The results obtained from the process of the above example were as follows:

| PRODUCT | AMOUNT | CONCEN-TRATION | GRAMS OF H3BO3 |
|---|---|---|---|
| Colemanite | 100.0 g. | 29.96% | 29.96 g. |
| Grey Cake | 85.28 g. | 0.18% | 0.15 g. |
| As2S3 Cake | 0.41 g. | 0.00% | 0.00 g. |
| Crystals | 24.96 g. | 89.50% | 22.31 g. |
| Final Liquor | 127.0 ml. | 56.22% | 7.14 g. |

The yield of the crystals of boric acid obtained through the process of this example was 74.56%, while the extraction percentage, considering the discarded liquor, was 98.39% even though the amount of boric acid contained in the full liquor was not recuperated.

EXAMPLE 2

Obtainment of Boric Acid Starting from Colemanite with Recycling of Liquors

The process of example 1 was repeated, but instead of discarding the final liquor filtrated from the crystallization, the 125 ml. of said liquor were diluted with water up to a volume of 650 ml. The solution was heated at its boiling point and 100 grams of grounded colemanite mineral were added. Then 75 ml. of sulfuric acid (1:3) were slowly added to the solution while agitating, and the mixture was heated to its boiling point.

The suspension was filtered while hot, and the grey cake thus obtained was washed with 100 ml. of water at of 95° C. and a cake having a weight of 178.0 grams was obtained.

The obtained filtrate was treated with excess gaseous hydrogen sulfide and the solution was left to rest at a temperature of about 23° and 30° C. in order to allow the precipitation of the arsenic sulfide produced in the reaction and the suspension thus obtained was filtered.

The cake of arsenic sulfide was washed with 50 ml. of water at a temperature of 25° C. and the filtrated was boiled in order to eliminate the excess hydrogen sulfide.

Then ammonium hydroxide was added drop by drop to the cited filtrated until the solution was neutralized at a pH of 7. Next the solution was heated for 2 minutes in order to get rid off the excess of ammonia and to precipitate all of the aluminum hydroxide contained in the solution.

The solution was left to rest, then it was decanted and the liquor was filtered at a temperature of 28° C., obtaining a resulting filtrate of 800 ml.

The solution was acidified with 5 ml. of sulfuric acid 1:3. It was concentrated evaporating a volume from 800 ml. to a volume of 150 ml., and the concentrated liquor was cooled from a temperature of 98° C. to 28° C. thereby crystallizing the additional boric acid which was then separated by filtration. A filtrate in a volume of 120 ml. and a greater amount of boric acid crystals were obtained by the process shown in Example 1.

The results obtained from the above example are as follows:

| PRODUCT | AMOUNT | CONCEN-TRATION | GRAMS OF H3BO3 |
|---|---|---|---|
| Colemanite | 100.0 g. | 29.93% | 29.93 g. |
| Grey Cake | 84.45 g. | 0.18% | 0.15 g. |
| As2S3 Cake | 0.40 g. | 0.00% | 0.00 g. |
| Crystals | 32.92 g. | 86.55% | 23.40 g. |
| Recycled Liq. | 120.0 ml. | 56.22 g./liter | 07.14 g. |
| Final Liquor | 12.0 ml. | 65.54 g./liter | 07.86 g. |

The yield of boric acid crystals obtained through the process provided by this example was 94.88%, while the percentage of extraction of total boric acid, including the final filtrate, was 97.81%.

It can be seen from the above that by recycling the final liquors a considerable increase in the yield of boric acid crystals is obtained.

From the above it can be seen that a new process has been provided for the obtainment of boric acid from colemanite and/or howlite minerals, suitable for the beneficiation of minerals having a low content of boron compounds and a high content of arsenic, iron and aluminum impurities so as to obtain boric acid crystals of a high purity, with highly recuperation percentages and which can be from 75 to 95% regarding the content of boron contained in the original mineral. All of which by carrying out process steps which are very simple and economical allowing the possibility of exploitation of colemanite, and/or howlite minerals which, up to now, had been impossible to exploit through the use of traditional process. Thus this method greatly contributes to the boric acid production, starting from the boric acid thus obtained, particularly for utilization in the glass industry. This is so because the colemanite and howlite mineral deposits have a poor concentration and a high contamination, are very large and abundant.

Even though the above has shown and described various embodiments of the present invention, it must be pointed out that numerous modifications to said embodiments are possible. Therefore, the present invention must not be considered to be restrictive, except with respect to that which is required by the mentioned technology and by the scope of the attached claims.

I claim:

1. A process for the preparation of boric acid from colemanite minerals, howlite minerals, or mixtures thereof, comprising: (a) treating the mineral with sulfuric acid and water in order to dissolve boron which forms a solution in a suspension with insoluble solids; (b) separating the solution from the insoluble solids of the suspension; (c) reacting the separated solution with hydrogen sulfide in order to precipitate arsenic impurities; (d) separating the precipitated impurities from the solution of step (c); (e) reacting the solution remaining after the separation of the precipitated impurities, with ammonia, in order to precipitate aluminum and iron impurities; (f) separating the precipitated aluminum and iron impurities from the solution of step (e); (g) reacting the solution of step (f) which comprises ammonium perborate with sulfuric acid at a temperature of about 70° C. to about 98° C. to transform the ammonium perborate to boric acid; (h) cooling the reaction product in order to precipitate boric acid magma, and (i) separating the boric acid from the cooled reaction product of step (h).

2. The process as claimed in claim 1, wherein the solution of the cooling stage of step (h) and the solution obtained from the filtration of boric acid crystals are preheated and recycled to step (a).

3. The process as claimed in claim 1, wherein the reaction product obtained in step (g) is subjected to evaporation before cooling so as to increase the concentration of the boric acid.

4. The process as claimed in claim 1, wherein the reaction of the mineral with the sulfuric acid is carried out at a temperature between about 85° C. and the boiling point of the reaction product.

5. The process as claimed in claim 4 wherein the reaction of the filtrate of step (a) with hydrogen sulfide is carried out at a temperature between about 32° C. and about 90° C.

6. The process as claimed in claim 5, wherein the reaction with ammonia to separate the impurities of aluminum, is carried out at a temperature between about 95° C. and the boiling point of the reaction mixture.

7. The process as claimed in claim 1, wherein the cooling stage of step (h) is carried out at a temperature between about 20° C. and 30° C. such that crystallization of the boric acid occurs.

* * * * *